United States Patent
Man

(10) Patent No.: US 9,133,897 B2
(45) Date of Patent: Sep. 15, 2015

(54) FREEWHEEL FOR A CRANK-CVT TRANSMISSION

(75) Inventor: Laszlo Man, Ottersweiler-Unzhurst (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 299 days.

(21) Appl. No.: 13/108,455

(22) Filed: May 16, 2011

(65) Prior Publication Data

US 2011/0226577 A1    Sep. 22, 2011

Related U.S. Application Data

(63) Continuation of application No. PCT/DE2009/001568, filed on Nov. 5, 2009.

(30) Foreign Application Priority Data

Dec. 1, 2008   (DE) .................. 10 2008 059 809

(51) Int. Cl.
   *F16D 41/07*   (2006.01)

(52) U.S. Cl.
   CPC ..................... *F16D 41/07* (2013.01)

(58) Field of Classification Search
   CPC ....................................................... F16D 41/07
   USPC ........ 188/82.8; 192/45.1, 41 A, 45.2, 45.016, 192/45.019
   See application file for complete search history.

(56) References Cited

U.S. PATENT DOCUMENTS

| 2,638,195 | A | * | 5/1953 | Tibbetts | 192/45.1 |
| 2,837,189 | A | * | 6/1958 | Sauzedde | 192/45.1 |
| 2,881,886 | A | * | 4/1959 | Troendl et al. | 192/45.1 |
| 2,954,855 | A | * | 10/1960 | Lund | 192/45.1 |
| 3,012,646 | A | * | 12/1961 | Zlotek | 192/45.1 |
| 3,311,204 | A | * | 3/1967 | Barnard | 192/41 A |
| 3,643,768 | A | * | 2/1972 | Titt | 192/41 A |

(Continued)

FOREIGN PATENT DOCUMENTS

| EP | 1 650 071 A2 | 4/2006 |
| JP | 06 050358 A | 2/1994 |
| JP | 2006 207797 A | 8/2006 |
| WO | 2008/066469 A1 | 6/2008 |

OTHER PUBLICATIONS

International Preliminary Report on Patentability in International Application No. PCT/DE2009/0001568, Jun. 7, 2011, (2 pgs.).*

(Continued)

*Primary Examiner* — Gene Crawford
*Assistant Examiner* — Terry Chau
(74) *Attorney, Agent, or Firm* — Lucas & Mercanti, LLP

(57) ABSTRACT

A freewheel, which has an inner ring, an outer ring that can be rotated relative to the inner ring in at least one rotational direction and which is disposed radially around the inner ring, a plurality of rolling bodies, which are disposed between the inner ring and the outer ring, and at least one rolling body suspension for suspending the rolling bodies in the direction of the inner ring. The rolling body suspension has a spring which overall has a circular shape and is adapted such that the rolling bodies are loaded radially inward in the radial direction of the freewheel. In a plane that is formed by the longitudinal direction and the radial direction of the freewheel, the spring has a substantially rectangular profile.

6 Claims, 14 Drawing Sheets

(56) References Cited

U.S. PATENT DOCUMENTS

| | | | | |
|---|---|---|---|---|
| 4,373,620 A | * | 2/1983 | Zlotek | 192/41 A |
| 5,960,917 A | * | 10/1999 | Still | 192/45.1 |
| 8,151,960 B2 | * | 4/2012 | Jonsson | 192/45.1 |
| 8,424,660 B2 | * | 4/2013 | Man | 192/45.1 |

OTHER PUBLICATIONS

Translation of the PCT Written Opinion of the International Authority in International Application No. PCT/DE2009/0001568, Jun. 7, 2011, (11 pgs.).*

* cited by examiner

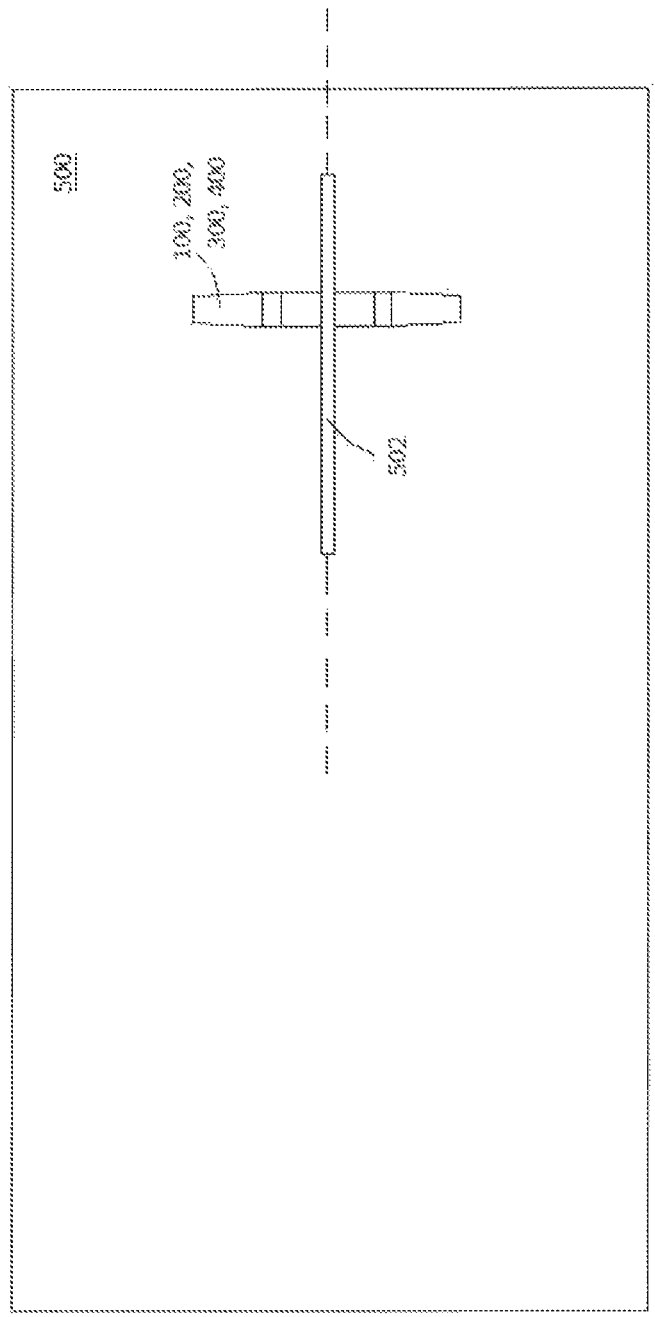

FREEWHEEL FOR A CRANK-CVT TRANSMISSION

This application is a Continuation of PCT/DE2009/001568 filed Nov. 5, 2009, which is turn claims the priority of DE 10 2008 059 809.7, filed Dec. 1, 2008, the priority of both applications is hereby claimed and both applications are incorporated by reference herein.

FIELD OF THE INVENTION

The present invention relates to a freewheel for a crank-CVT transmission, in particular a freewheel for a crank-CVT transmission which comprises a rolling element spring system for the springing of rolling elements. The present invention further relates to a crank-CVT transmission.

BACKGROUND OF THE INVENTION

A crank-CVT transmission is disclosed by EP 1 650 071 A2, for example. An adjustable eccentric drive arrangement with eccentric components, which is connected by connecting rod-like connecting elements to a driven shaft, which forms an output or driven shaft in relation to the transmission, is provided on an input shaft, which can be driven by an engine and which forms a driving shaft in relation to the transmission. The driven shaft is driven to rotate by transmitting the stroke of the connecting elements to the driven shaft and hence to the output side of the transmission by means of freewheel devices. The freewheel devices are provided between the connecting rod-like connecting elements and the driven shaft.

Freewheel device for a crank-CVT transmission have sprags, which are arranged between an inner ring formed by an area of the driven shaft and an outer ring. Here the faces of the outer ring and of the inner ring are matched to one another in such a way that in one direction of relative rotation between the inner ring and the outer ring the sprags can lock this rotation, so that the outer ring and the inner ring are rotated together. In the other direction of relative rotation between the outer ring and the inner ring the sprags do not produce any locking action. The individual sprags are acted upon in the locking direction, which can be achieved by at least one spring element.

Reversible freewheels are also known, in which the locking direction and the freewheel direction can be changed by operating a reversing mechanism.

Freewheel devices for a transmission, in particular for a crank-CVT transmission of a motor vehicle, are furthermore known, which comprise sprags held in a cage between an outer ring and an inner ring. Here each sprag can be pressed against the inner ring by an energy storage device with a relatively large contact pressure. A mechanism allows the sprag to be set to the release direction or to the locking direction, the energy storage device being designed so that with a relatively large contact pressure it generates a relatively low setting force for setting the sprags.

Such an energy storage device may take the form of an annular groove spring or a spiral spring (garter spring), which engages in garter spring grooves of the sprags. In this case the garter spring grooves are designed so that the garter spring on the one hand generates the relatively high contact pressure between the inner ring and the sprags, but on the other hand generates the contact pressure for the setting torque via a small lever arm. The garter spring can be designed so strong that the resulting contact pressure between the sprags and the inner ring and the resultant friction force in the slipping of the sprags is high enough to ensure a damping function.

However, a garter spring which is designed so strong that the resulting contact pressure between the sprags and the inner ring and the resultant friction force in the slipping of the sprags is high enough to ensure a damping function takes up a large overall space in the axial direction (longitudinal direction) of the freewheel. A garter spring having a large axial extent in the longitudinal direction of the freewheel consequently also results in a large axial extent of the overall freewheel in the longitudinal direction of the freewheel. Moreover, the rolling elements of the known freewheels, which comprise an energy storage device in the form of a spring, in particular a garter spring, are always arranged in a cage. Freewheels with a cage have a short service life, particularly in the very high dynamics range, since in the case of high dynamics the sprags strike the cage and can thereby destroy the latter.

SUMMARY OF THE INVENTION

An object of the present invention, therefore, is to provide a freewheel, in particular a freewheel for a crank-CVT transmission, which comprises at least one rolling element spring system, which takes up a small overall axial space in the longitudinal direction of the freewheel. A further object of the invention is to provide a freewheel, in particular a freewheel for a crank-CVT transmission, which provides multiple rolling elements, which are designed in such a way that they allow springing and damping by means of a spring even in the absence of a cage.

The present invention is based on the idea that by varying the geometry of the rolling element spring system for rolling elements of a freewheel, the freewheel can be designed with smaller dimensions in an axial direction than is the case in a conventional rolling element spring system. Since the reduction in the extent of the rolling element spring system in a longitudinal direction of the freewheel is simultaneously accompanied by an increase in the radial dimensions of the rolling element spring system, if the spring force of the conventional rolling element spring system is to correspond to the spring force of the rolling element spring system of smaller axial extent, the dimensions of the rolling element spring system will increase in a radial direction. According to the invention, therefore, with a progressive reduction in its axial extent the rolling element spring system assumes a substantially rectangular profile in a plane which is spanned by the longitudinal direction and the radial direction of the freewheel, and therefore takes up less room or overall space in an axial direction of the freewheel, which leads to an altogether more space-saving construction of the freewheel in an axial direction. In order to be able to ensure a constant and uniform springing of all rolling elements regardless of their deflection position, the rolling element spring system comprises a spring of circular overall shape, that is to say a spring, the ends of which are connected together in such a way that it has a circular shape and is designed to apply a radially inward load to the rolling elements in the radial direction of the freewheel. The spring therefore encloses all rolling elements together.

A freewheel is therefore provided, which comprises an inner ring, an outer ring, which is rotatable in at least one direction of rotation relative to the inner ring and which is arranged radially around the inner ring, multiple rolling elements, which are arranged between the inner ring and the outer ring, and at least one rolling element spring system, which corresponds to an overall circular spring, which is of small extent in the axial direction of the freewheel and which serves for the springing of the rolling elements in the direction of the inner ring.

According to a preferred embodiment the spring of the rolling element spring system is a spring meandering in the circumferential direction of the freewheel. The spring therefore comprises a plurality of loops, which extend in the circumferential direction of the freewheel or run in the circumferential direction of the freewheel and the starting and end loops of which are connected together in such a way that the spring contains an altogether and therefore all in all circular shape. A meandering spring affords the advantage of having a small axial extent in the longitudinal direction of the freewheel, and a rectangular profile in the plane which is spanned by the longitudinal direction and the radial direction of the freewheel, and consequently a space-saving shape in the axial direction of the freewheel.

The rolling element spring system is preferably arranged between the rolling elements and the outer ring. This means that the rolling element spring system encloses all rolling elements together over the entire circumference of the freewheel, radially outside the rolling elements, and uniformly applies a radially inward load to each rolling element in the radial direction of the freewheel. Since the rolling element spring system is arranged between the rolling elements and the outer ring, it is possible to endow the rolling element spring system with an extremely short extent in the longitudinal direction of the freewheel, which leads to an altogether space-saving design of the freewheel in the longitudinal direction of the freewheel.

The rolling elements preferably comprise a groove for receiving the rolling element spring system. Here the groove is applied to that rolling element surface which is oriented towards the outer ring of the freewheel and it extends transversely to the longitudinal direction of the freewheel. The groove serves for guiding the rolling element spring system and prevents it slipping in the longitudinal direction of the freewheel. A reliable and constantly uniform springing and damping of the rolling elements can therefore be afforded over the entire circumference of the freewheel.

The rolling element spring system is advantageously designed in such a way that overall it has a circular cylindrical inner face. The inner face of the rolling element spring system here corresponds to the bearing face, which comes into contact with the rolling elements or with the grooves in the rolling elements. A circular cylindrical inner face and bearing or contact face serves constantly to ensure a correct contact between the rolling element spring system and the rolling elements, so that a low setting force can be achieved over the entire angle of rotation of the rolling elements with a simultaneously high damping.

According to a preferred embodiment the rolling element spring system comprises a first spring and a second spring for the springing of the rolling elements in the direction of the inner ring. Here both the first spring and the second spring are designed as springs of circular overall or entirely circular shape. If the rolling element spring system comprises a first spring and a second spring, both the first spring and the second spring can be of smaller and hence more space-saving design, since the spring force required for the springing and damping of the rolling elements is divided between two springs. In addition, the springing relative to the axial direction is uniform, so that a tilting of the rolling elements in an axial direction is avoided.

The first spring is preferably arranged at a first rolling element end in the longitudinal direction of the freewheel and the second spring at a second rolling element end in the longitudinal direction of the freewheel. In this way a uniform loading of the rolling elements can be ensured over their entire extent in the longitudinal direction of the freewheel in any deflection position and therefore over their entire rotational range. In this case each of the springs radially encloses the rolling elements externally, for example.

Alternatively, the first rolling element end and the second rolling element end each comprises a pin-like projection for the locating of the respective first or second spring, so that the springs enclose all of the pin-like projections, in doing which they may not necessarily externally enclose the rolling elements, but are able to overlap these in the radial direction of the freewheel, for example. The pin-like design of a projection further has the advantage that meandering springs having a plurality of loops can be suspended from these projections. Additional fixtures or devices for locating of the springs can therefore be avoided, which produces a weight saving for the freewheel and also a space-saving configuration of the freewheel. Here the normal force available to the springs for damping is sufficient to hold the springs in their position in opposition to the circumferential acceleration.

The pin-like projections are preferably enclosed by at least a part of the meandering spring. Thus, for example, not only each loop, but also every second, every fourth, every sixth loop etc. may each enclose one of the pin-like projections. One or more projections may also be provided on the end faces of each of the projections for guiding the springs. In this way widely differing springs of meandering design, which have widely varying loop shapes, widths and numbers of loops, can be used and the damping characteristics can be varied as required.

According to a preferred embodiment the pin-like projection may be provided with a bearing. Here the bearing may be a slide bearing or a rolling bearing. Providing the projection with a bearing has the advantage of reducing the friction, which is generated during the rotation of the rolling elements between the pin-like projection and the meandering spring. Both the service life of the spring and that of the rolling element are thereby considerably extended.

According to a preferred embodiment the first rolling element spring system and the second rolling element spring system are designed in such a way that in a circumferential direction they have elongated loops, for example meandering loops, with a rolling area for rolling of the projection. Elongated loops allow the pin-like projection to roll along the elongated loop during the rotation of the rolling elements and in this way to reduce the friction, which is generated between the projection and the rolling element spring system.

In a further aspect a freewheel comprises an inner ring, an outer ring, which is rotatable in at least one direction of rotation relative to the inner ring and which is arranged radially around the inner ring, multiple rolling elements, which are arranged between the inner ring and the outer ring, and at least one rolling element spring system for the springing of the rolling elements in the direction of the inner ring. In this case the circumferential faces of the rolling elements, in particular the circumferentially lateral areas to adjacent rolling elements (lateral faces), at which the rolling elements are contiguous with one another, comprise concave and convex areas, which are designed in such a way that a first rolling element in a first maximum deflection position engages with its concave area in the convex area of a second rolling element, and that the second rolling element in a second maximum deflection position engages with its concave area in the convex area of the first rolling element. The two lateral faces of a rolling element are therefore substantially point-symmetrical with one another in respect of the concave and convex faces. In this way the interval of the rolling elements is constant in the two maximum deflection positions, that is to say both in the freewheel position and in the locking position. Consequently the rolling elements can be arranged between the inner ring and the outer ring of the freewheel even in the absence of a cage. This is particularly advantageous in the case of high dynamics, since due to their special shape the rolling elements always bear tightly against one another and are therefore not mutually destructive.

Besides an inner ring and an outer ring, which is rotatable in at least one direction of rotation relative to the inner ring, a freewheel preferably comprises at least one rolling element spring system for the springing of the rolling elements in the direction of the inner ring, and rolling elements, the lateral faces of which have concave and convex areas. In this case the lateral faces of the rolling elements are designed in such a way that a first rolling element in a first maximum deflection position engages with its concave area in the convex area of a second rolling element, and that the second rolling element in a second maximum deflection position engages with its concave area in the convex area of the first rolling element. The rolling element spring system is embodied as a spring of circular overall shape, which is designed in such a way that it applies a radially inward load to the rolling elements in the radial direction of the freewheel, and in such a way that it has a substantially rectangular profile in a plane which is spanned by the longitudinal direction and the radial direction of the freewheel.

A crank-CVT transmission is provided, which comprises at least one freewheel, which a rolling element spring system of circular overall shape and substantially rectangular profile in a plane, which is spanned by the longitudinal direction and the radial direction of the freewheel, and/or rolling elements, which have convex and concave areas on their lateral faces.

BRIEF DESCRIPTION OF THE DRAWINGS

The invention will be described below by way of examples and with reference to the figures attached, of which:

FIG. 14 shows a schematic diagram of the freewheel of an of the previous embodiments mounted on a shaft of a crank-CVT transmission.

DETAILED DESCRIPTION OF THE INVENTION

FIGS. 1 to 4 show a freewheel 100, which comprises an inner ring 10 and an outer ring 40 arranged radially around the inner ring 10.

Figure 1:
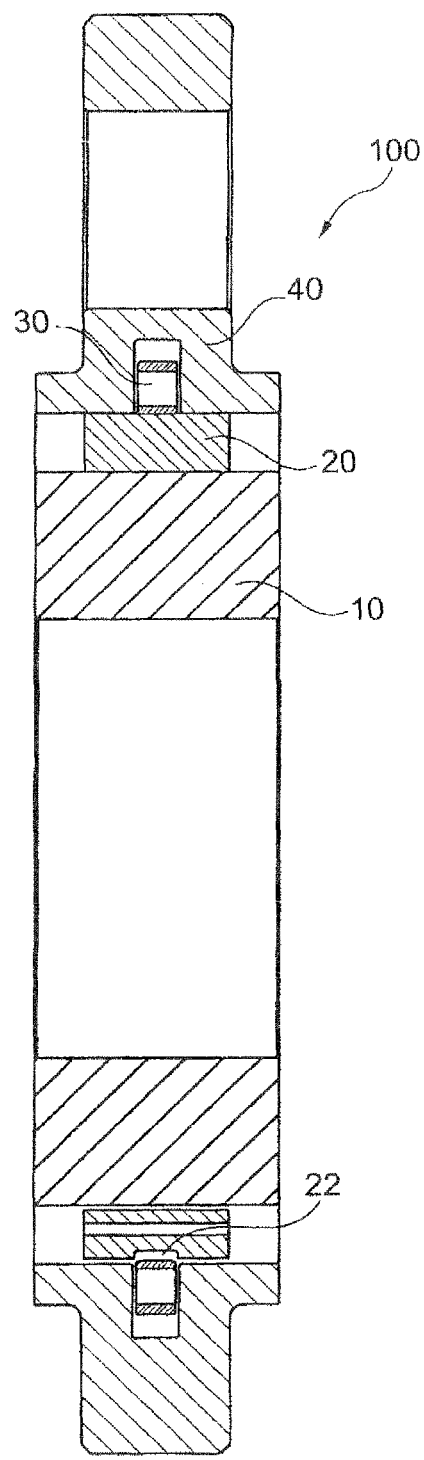
FIG. 1 shows a cross sectional view in an axial direction through a freewheel according to a first embodiment of the present invention.
Figure 2:
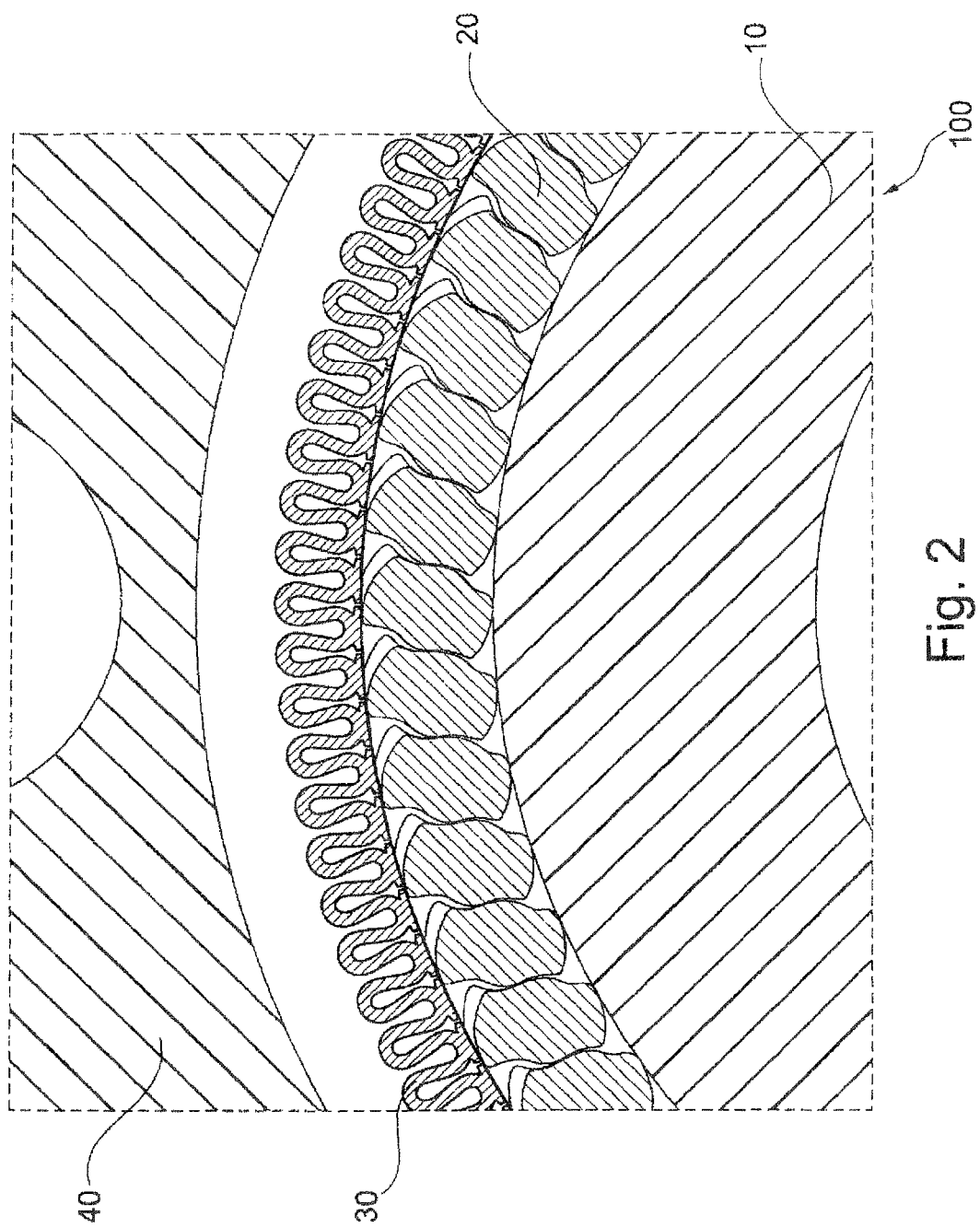
FIG. 2 shows a detail of a cross sectional view of the freewheel in a direction perpendicular to the axial direction.
Figure 3:
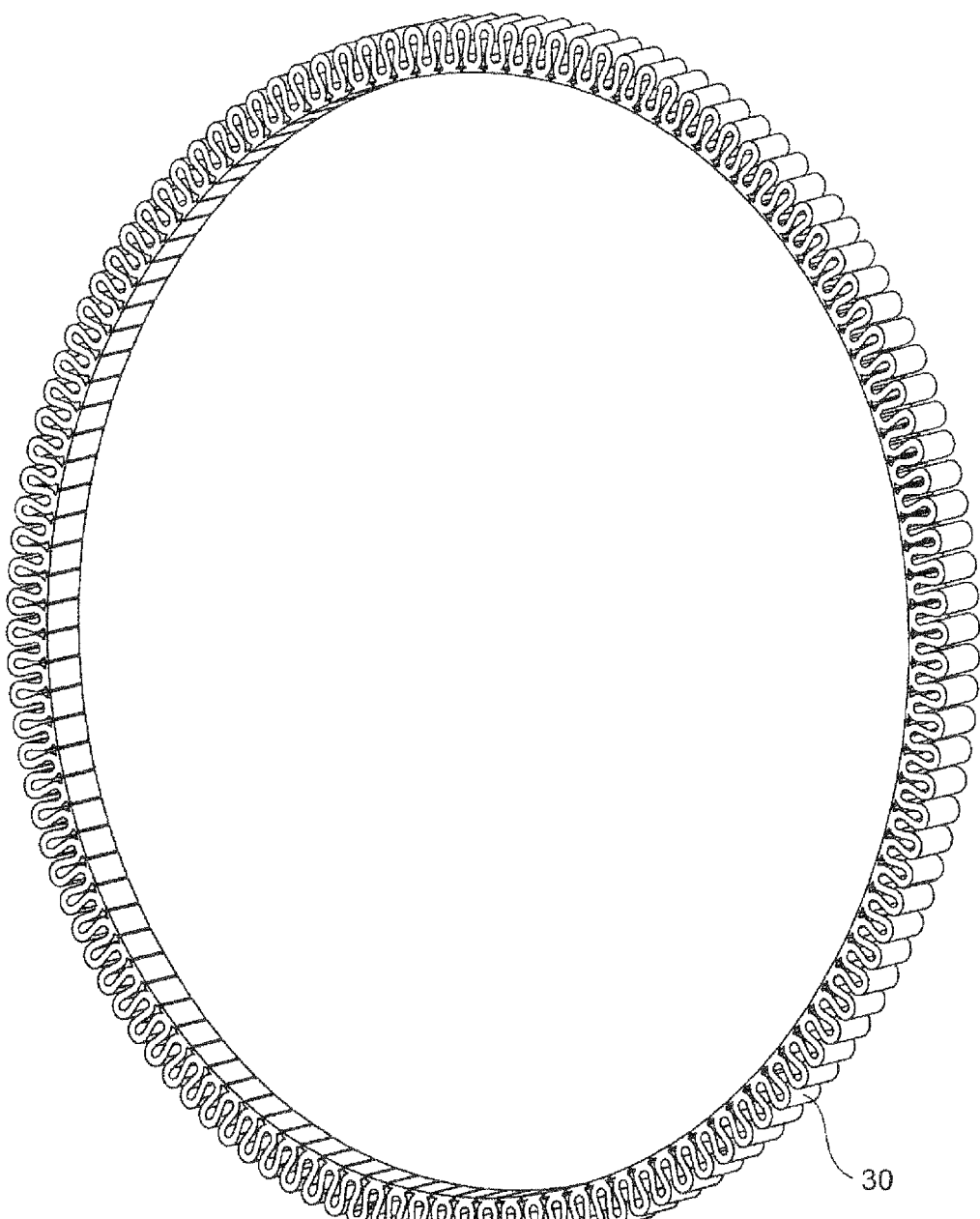
FIG. 3 shows a perspective view of a rolling element spring system according to the first embodiment.
Figure 4:
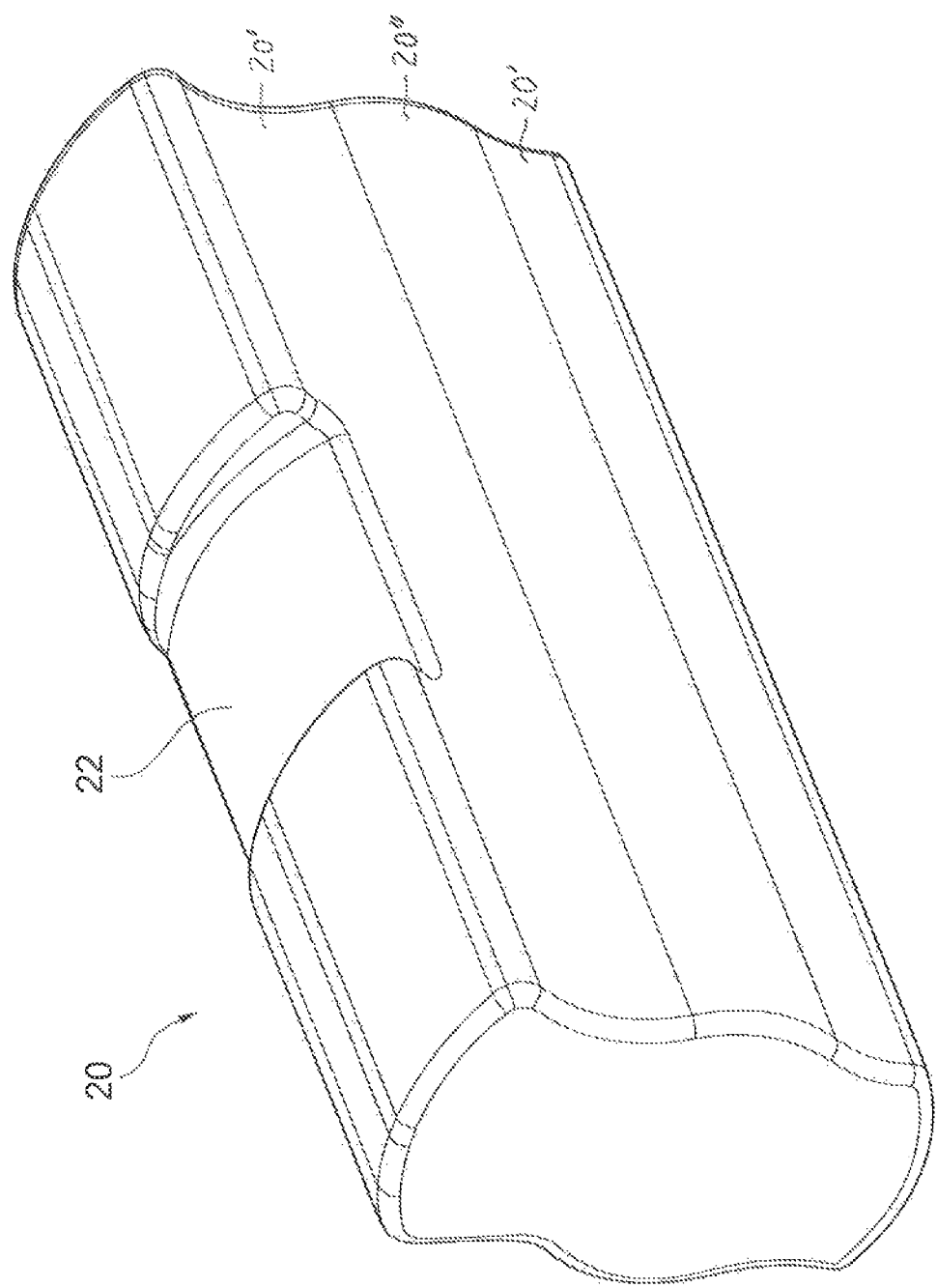
FIG. 4 shows a perspective view of a rolling element according to the first embodiment.

Rolling elements 20 are arranged between the inner ring 10 and the outer ring 40, rolling elements immediately adjacent in a circumferential direction being in bearing contact with one another or contiguous with one another, so that no cage is required in order to separate or guide them (FIG. 2). On their surface oriented towards the outer ring 40, the rolling elements 20 each comprise a groove 22, which is introduced into the respective rolling element 20 transversely to the longitudinal direction of the freewheel 100. In the top view of the rolling element 20, the groove 22 corresponds to a substantially rectangular depression and runs transversely to the longitudinal direction of the freewheel 100 and of the rolling element 20 (FIG. 4).

A common rolling element spring system 30 extending over the entire circumference of the freewheel 100 is located in the grooves 22 or on the rolling elements 20. Here the rolling element spring system 30 has a substantially rectangular profile in the plane of section represented in FIG. 1, and in the plane of section represented in FIG. 2 it has a meandering shape, that is to say the rolling element spring system 30 comprises a plurality of loops, which run in the circumferential direction of the freewheel 100. The outer ring 40 of the freewheel 100 is arranged radially outside the rolling element spring system 30. Since as a unit the rolling element spring system 30 is closed and as a unit forms a substantially circular ring (FIG. 3), it does not have to be separately held in position. In order to ensure a good seating and an outstanding contact of the rolling element spring system 30 with the rolling elements 20, the inner face of the rolling element spring system 30, which engages in the grooves 22 of the rolling elements 20, is cylindrically curved, that is to say the individual, radially inner meandering loops, at least on the outside, that is to say on the face oriented towards the inner ring, present the curvature, that overall results from the circular cylindrical shape.

In addition each of the rolling elements 20 has a specific shape, in particular a circumferential shape, which in the main consists of concave and convex areas on the lateral faces, at which the rolling element 20 is contiguous with adjacent rolling elements 20 in the assembly of the freewheel 100. Thus the rolling element 20 has a concave area. 20' in an upper third of the corresponding lateral face, a convex area 20" in the middle third and again a concave area 20' in the lower third. The second lateral face is of substantially identical design in terms of the convex and concave areas. Substantially S-shaped circumferential areas of the rolling elements contiguous with adjacent rolling elements 20 are also possible, provided that the rolling elements 20 bear tightly against one another when tilted in their two maximum deflection positions, and that an upper convex area engages in an upper concave area, or vice-versa, depending on whether it is the first or second deflection position.

Figure 5:
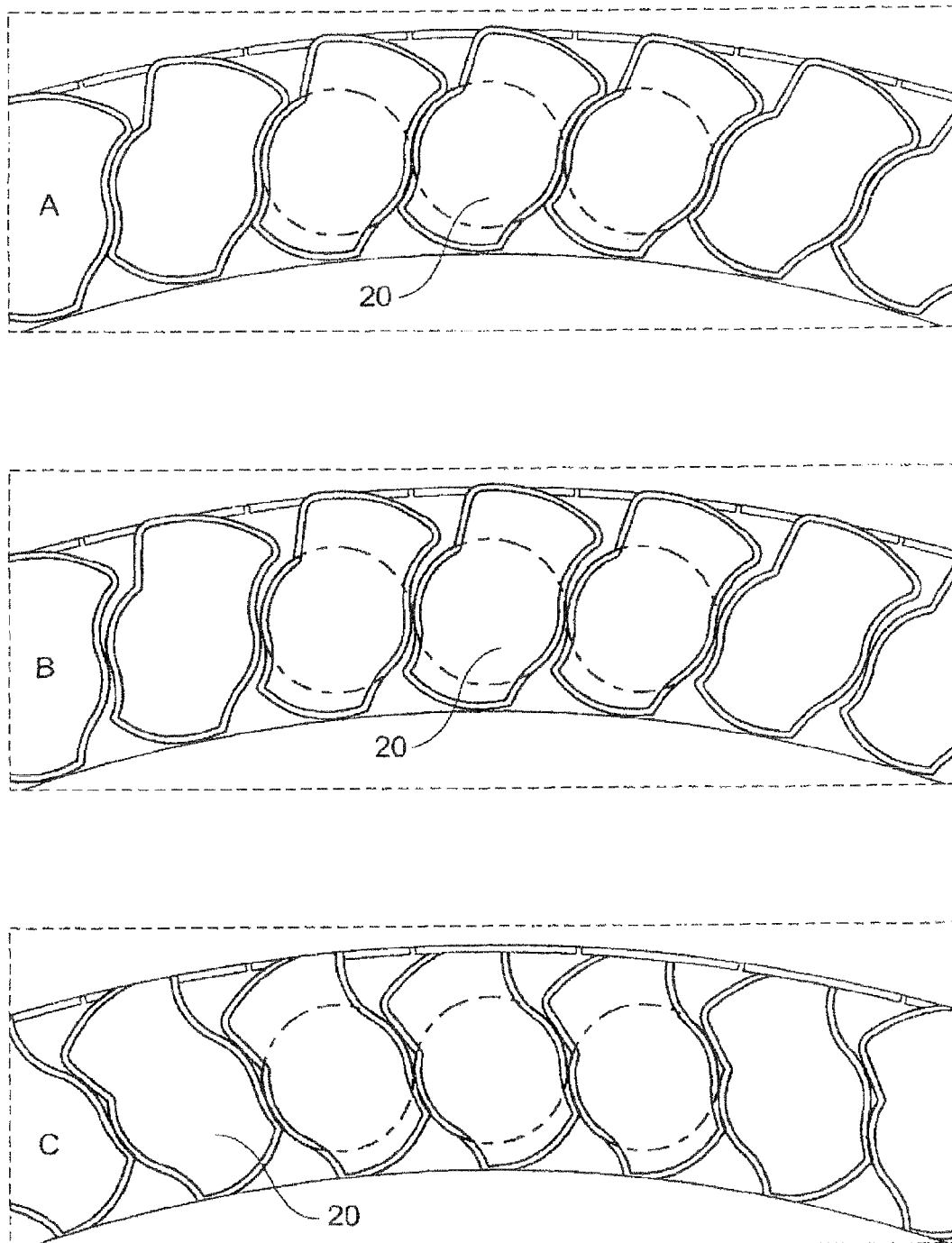
FIG. 5 shows the maximum deflection positions and a transitional position of the rolling elements in a top view of the freewheel, viewed in an axial direction.
Figure 6:
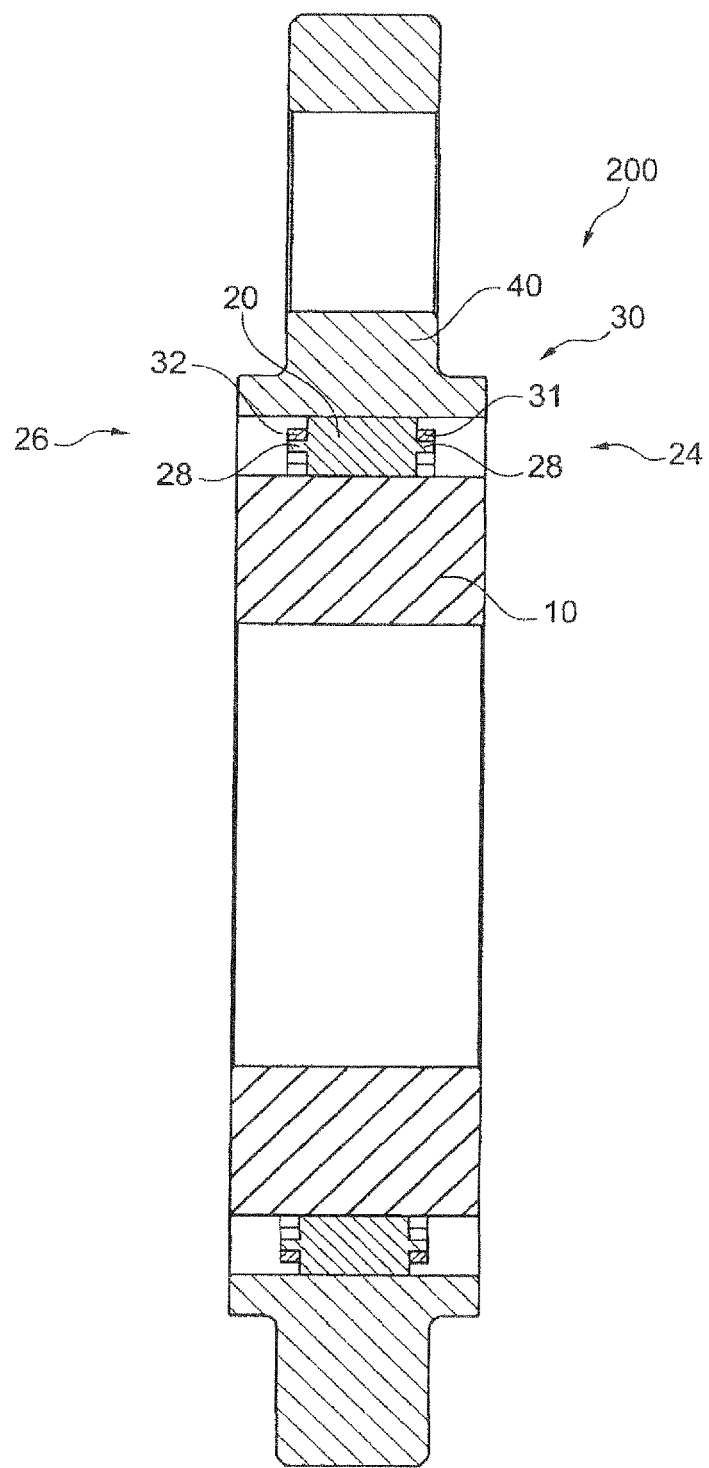
FIG. 6 shows a cross sectional view of a freewheel in an axial direction according to a further embodiment of the present invention.

Three deflection positions of the rolling element 20 can be seen from FIG. 5. Deflection position A corresponds to a first maximum deflection of the rolling elements 20. Here in each case a concave area of a first rolling element engages in the convex area of an adjacent second rolling element 20. Deflection position B shows the transitional position of the rolling element 20 when switching from a first maximum deflection to a second maximum deflection, the contiguous lateral faces of adjacent rolling elements rolling on one another in the middle third of the lateral faces, that is to say the two convex areas oriented towards one another. C shows the second maximum deflection position of the rolling elements 20. Here the convex area of the first rolling element 20 engages in the concave area of the adjacent second rolling element 20.

Figure 7:
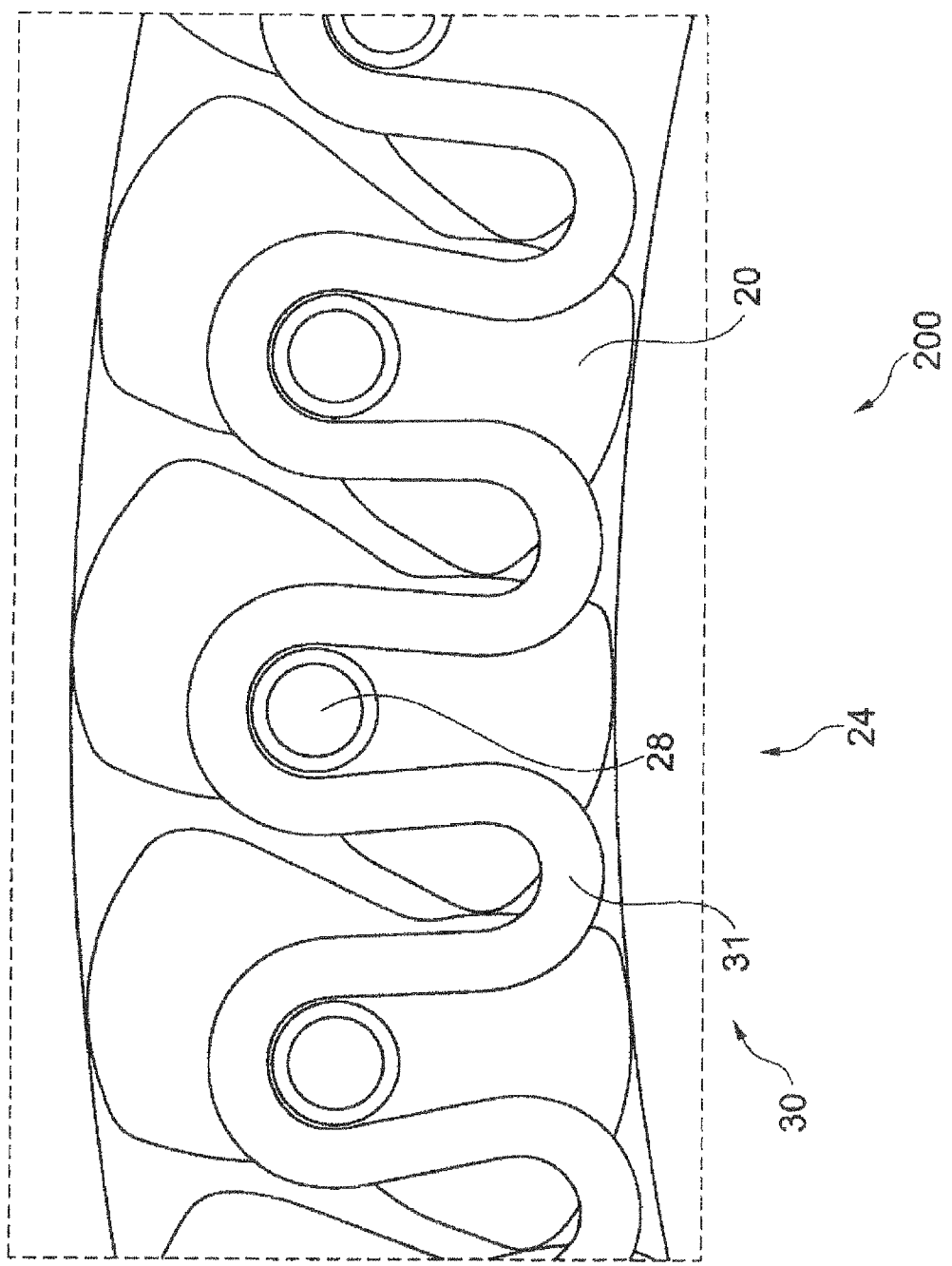
FIG. 7 shows a detail of a cross sectional view of the freewheel in FIG. 6 in a direction perpendicular to the axial direction.
Figure 8:
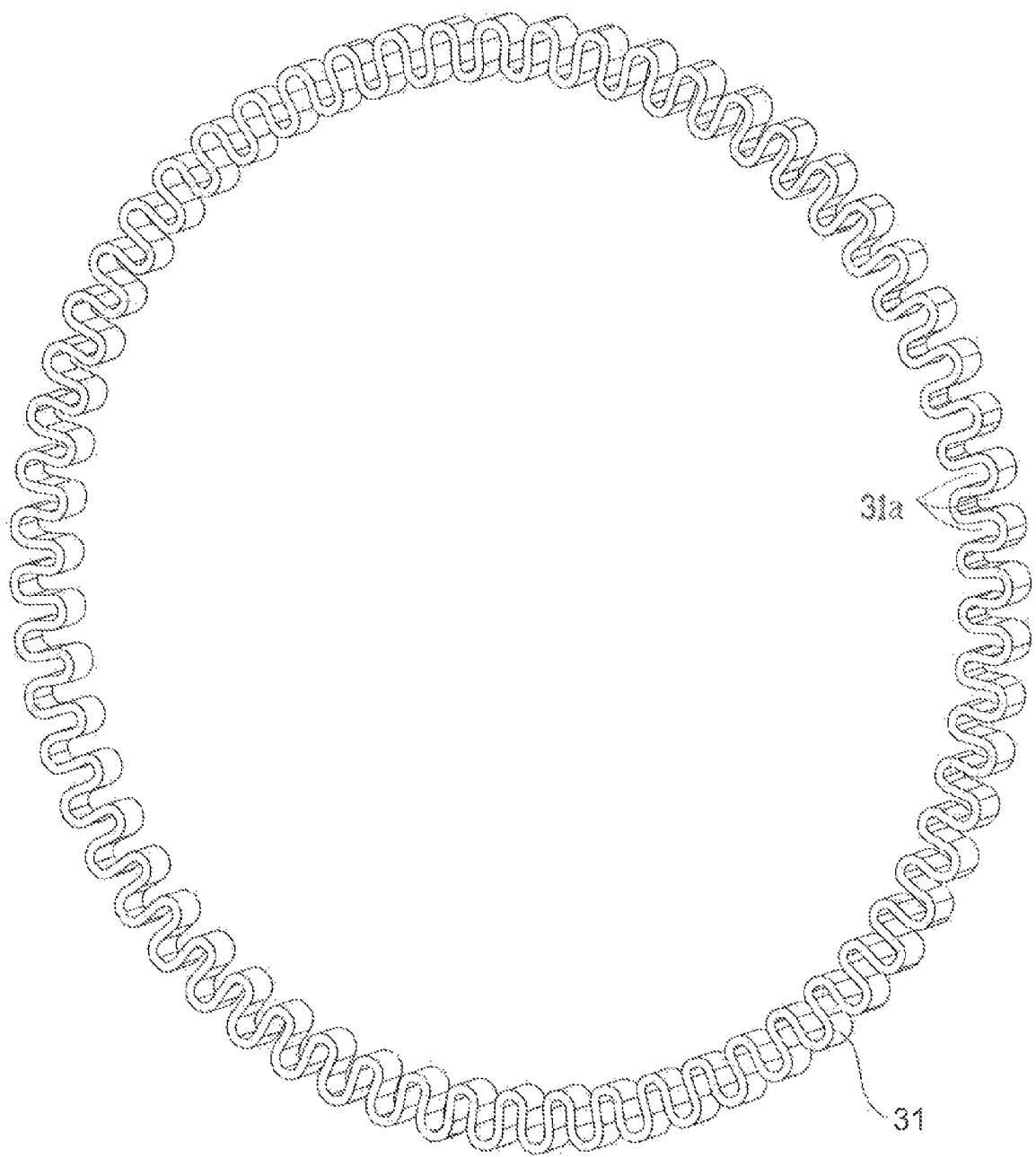
FIG. 8 shows a perspective view of a rolling element spring system in FIG. 6.
Figure 9:
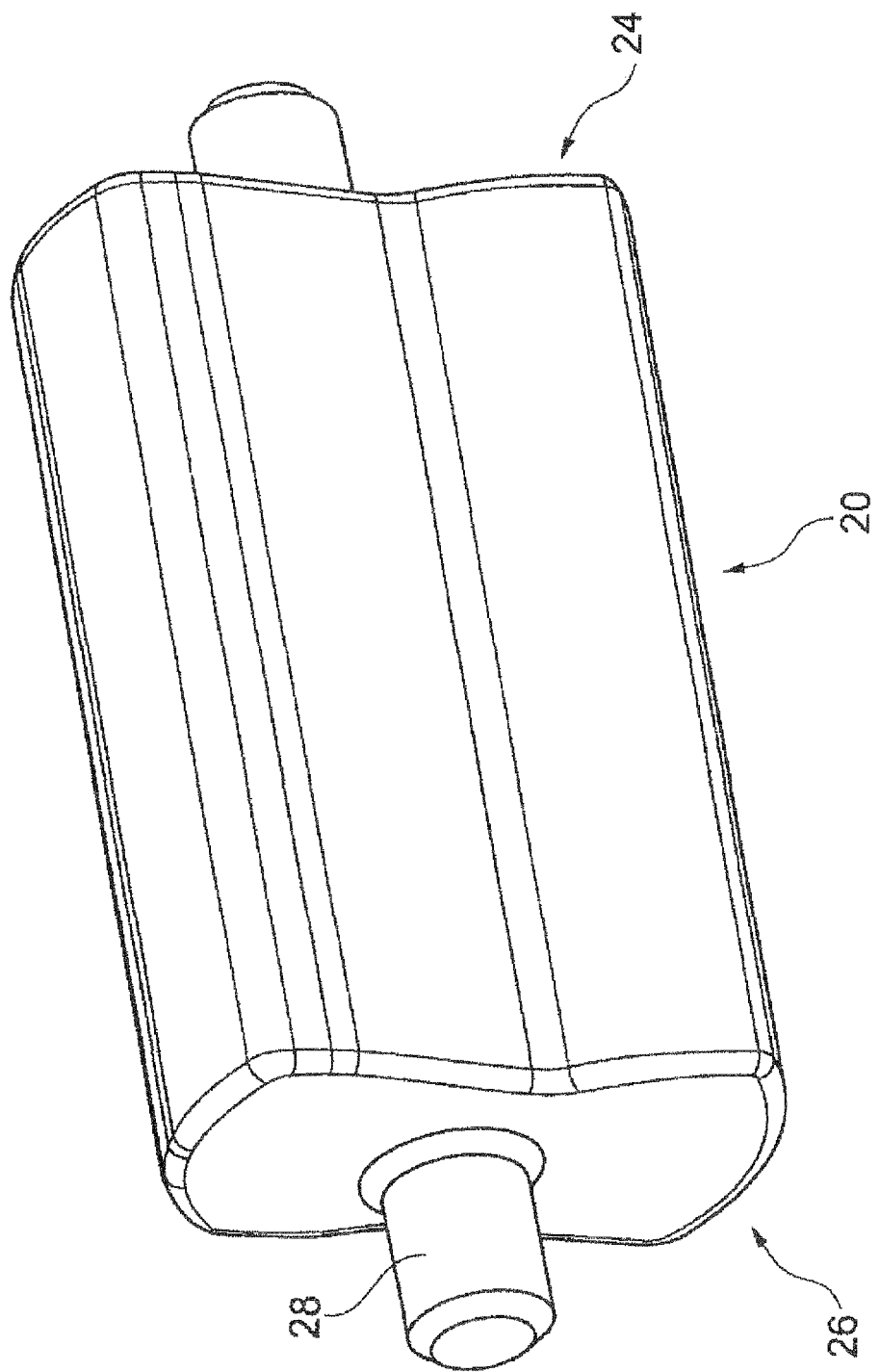
FIG. 9 shows a perspective view of a rolling element in FIG. 6.

A further embodiment of the present invention is shown in FIGS. 6 to 9. In contrast to the first embodiment, the rolling elements 20, at a first rolling element end 24 (right-hand side in FIG. 6) and at a second rolling element end 26 (left-hand side in FIG. 6) in the axial direction of the rolling elements 20, comprise pin-like projections 28 at the respective end faces, that is to say on the roiling element end faces which run perpendicular to the longitudinal direction of the freewheel 200. The projections 28 are circular cylindrical, for example, and extend in an axial direction. On the pin-like projections 28 a first spring 31 is located at the first rolling element end 24 and a second spring 32 is located at the second rolling element end 26. Here the first spring 31 and the second spring 32 together form the rolling element spring system 30. Only the first spring 31 can be seen in the view in FIG. 7. The first spring 31 (and correspondingly the second spring 32, of identical design hut not visible in FIG. 7) has a meandering shape. FIG. 7 shows that every second loop 31a of the first spring 31 comprises the pin-like projection 28. The second spring 32, which is located at the second rolling element end 26 of the freewheel 200, correspondingly encloses the pin-like projections 28. Here the first spring 31 (and the second spring 32) is formed from a circular overall shape (FIG. 8). Like the rolling element 20 in the first embodiment, the rolling element 20 in this embodiment comprises concave and convex areas at the lateral faces, which are contiguous with adjacent rolling elements 20 in the assembly of the freewheel 200.

Figure 10:
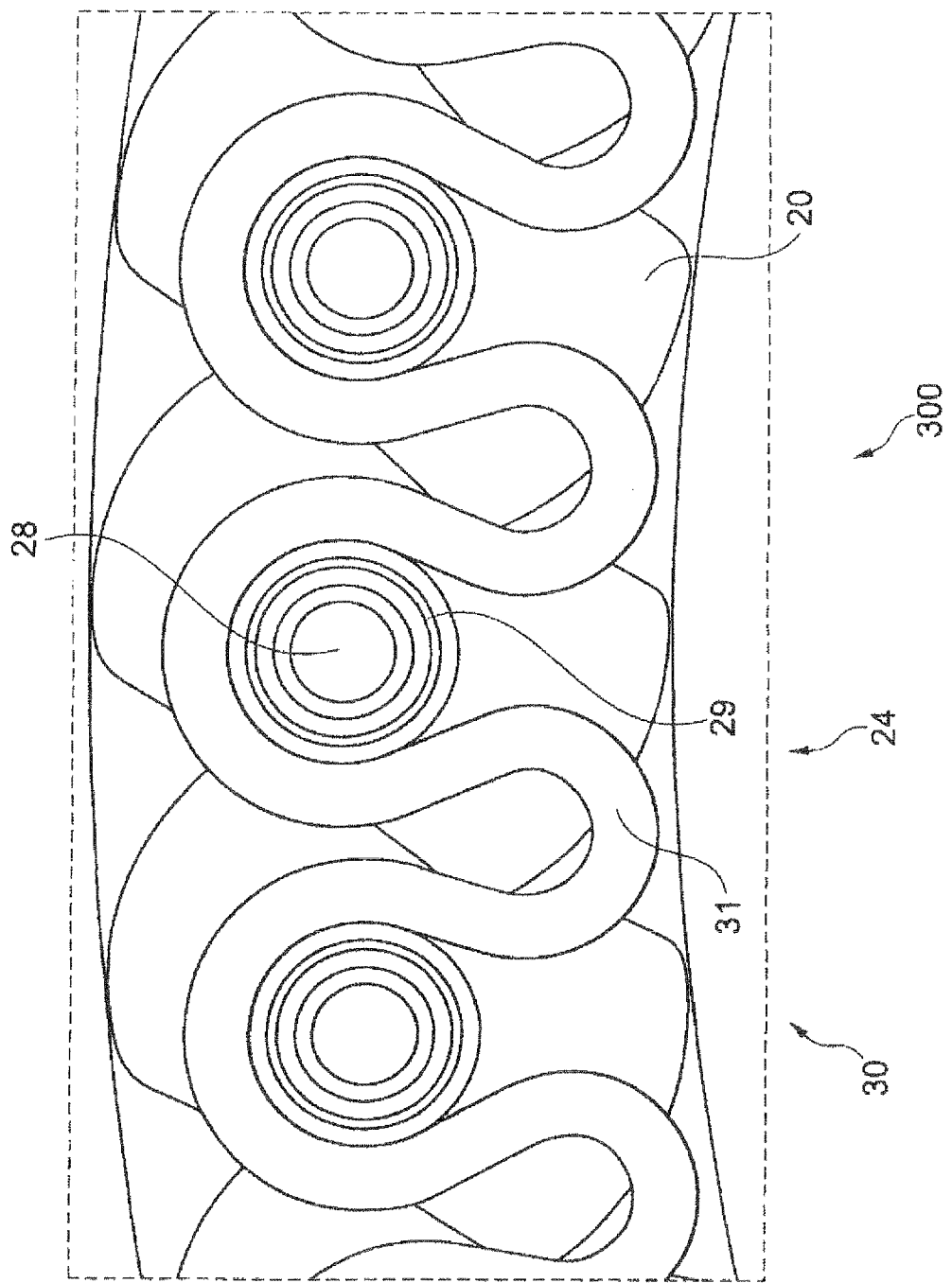
FIG. 10 shows a detail of a cross sectional view of a freewheel according to a further embodiment of the present invention in a direction perpendicular to the axial direction.
Figure 11:
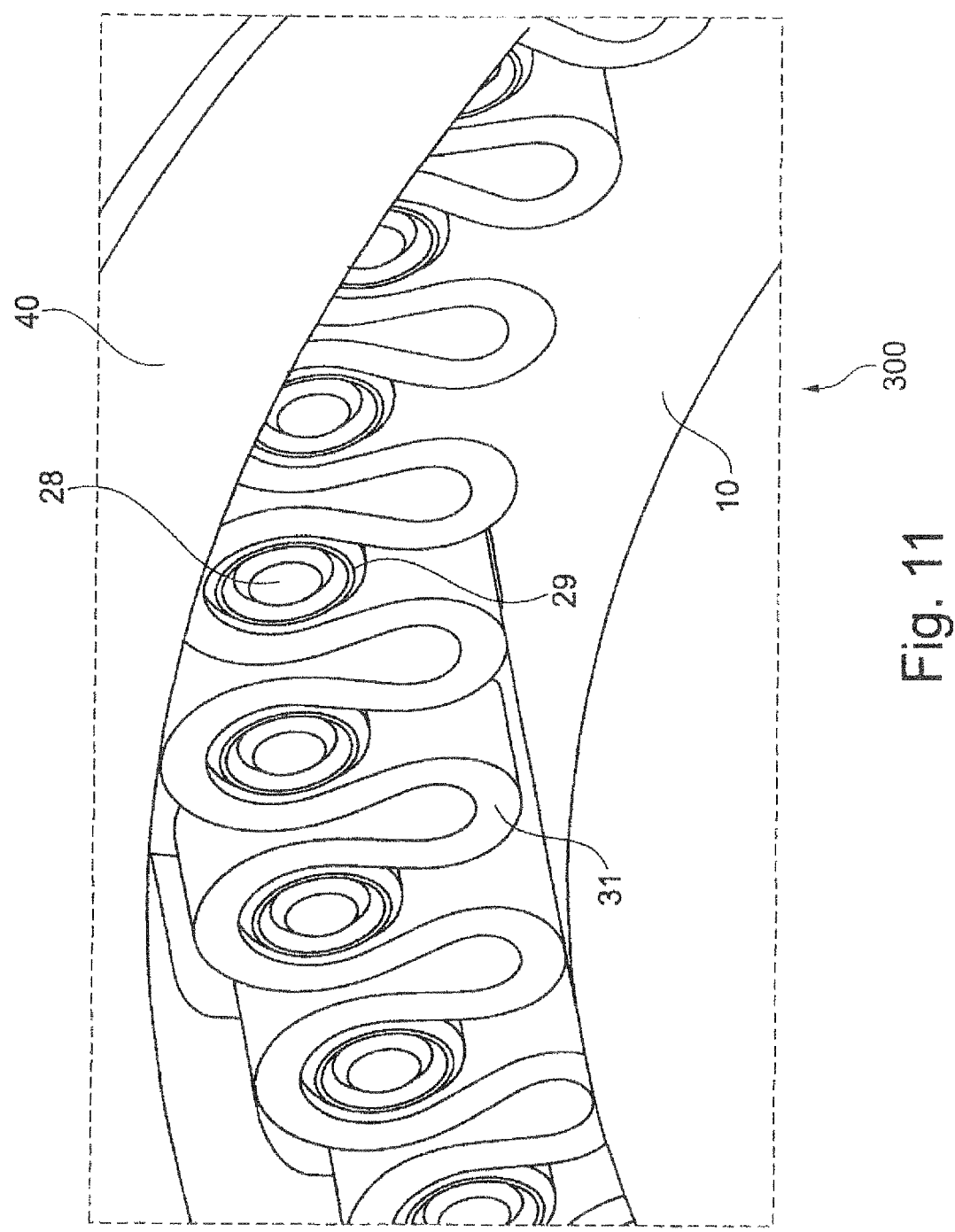
FIG. 11 shows a perspective view of a detail of the freewheel in FIG. 10.

FIGS. 10 and 11 show a detail of a freewheel 300 according to a further embodiment of the present invention, which substantially corresponds to the embodiment shown in FIGS. 6 to 9. In contrast to this embodiment, slide bearings 29 are arranged around each of the pin-like projections 28. Also, in the present embodiment only every second loop of the first spring 31 (and of the second spring 32) comprises one of the pin-like projections 28, which are each provided with a slide bearing 29. All other components of the freewheel 300 are identical to those in the embodiment of the freewheel 200.

Figure 12:
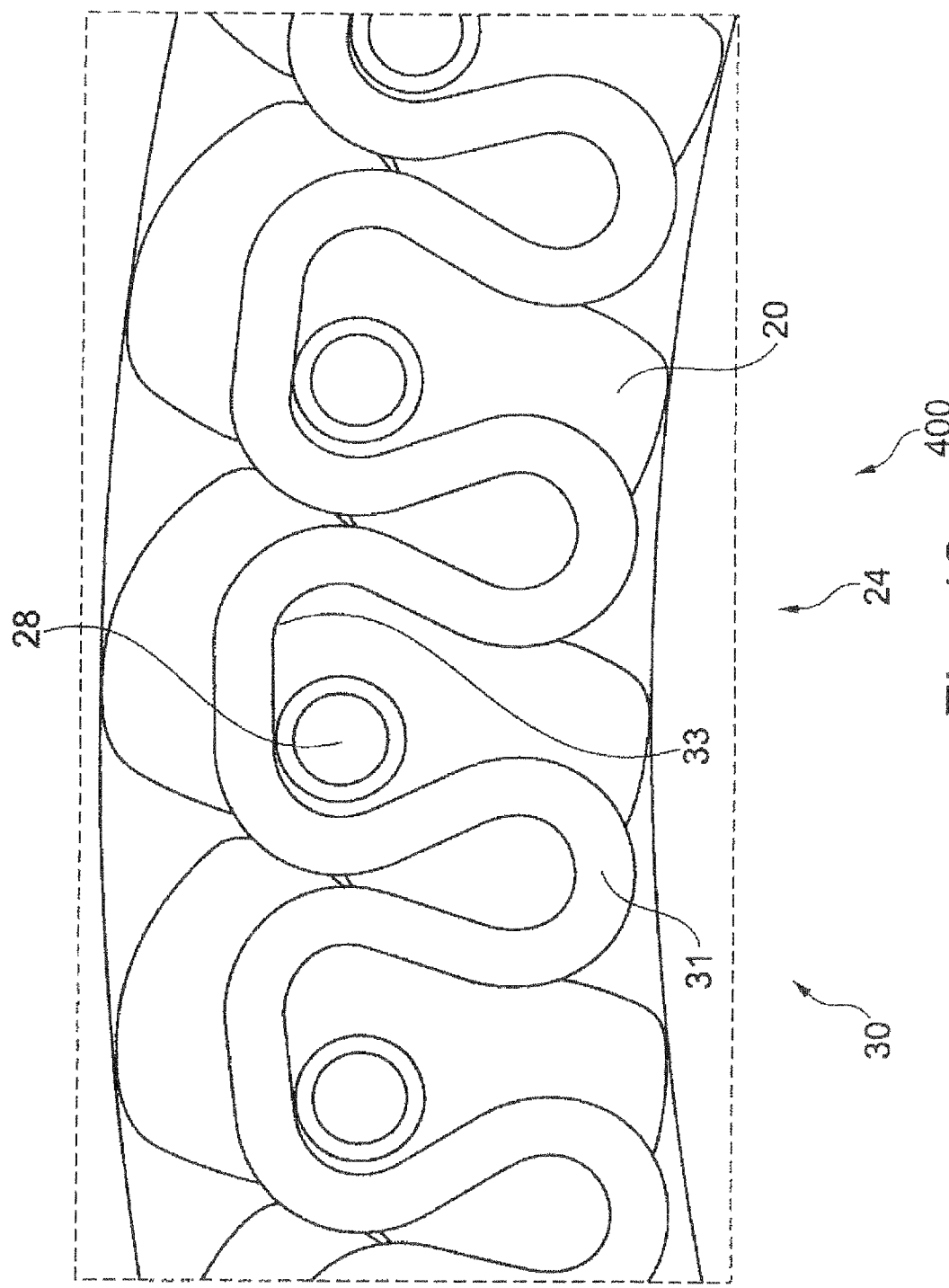
FIG. 12 shows a detail of a cross sectional view of a freewheel according to a further embodiment of the present invention is a direction perpendicular to the axial direction.
Figure 13:
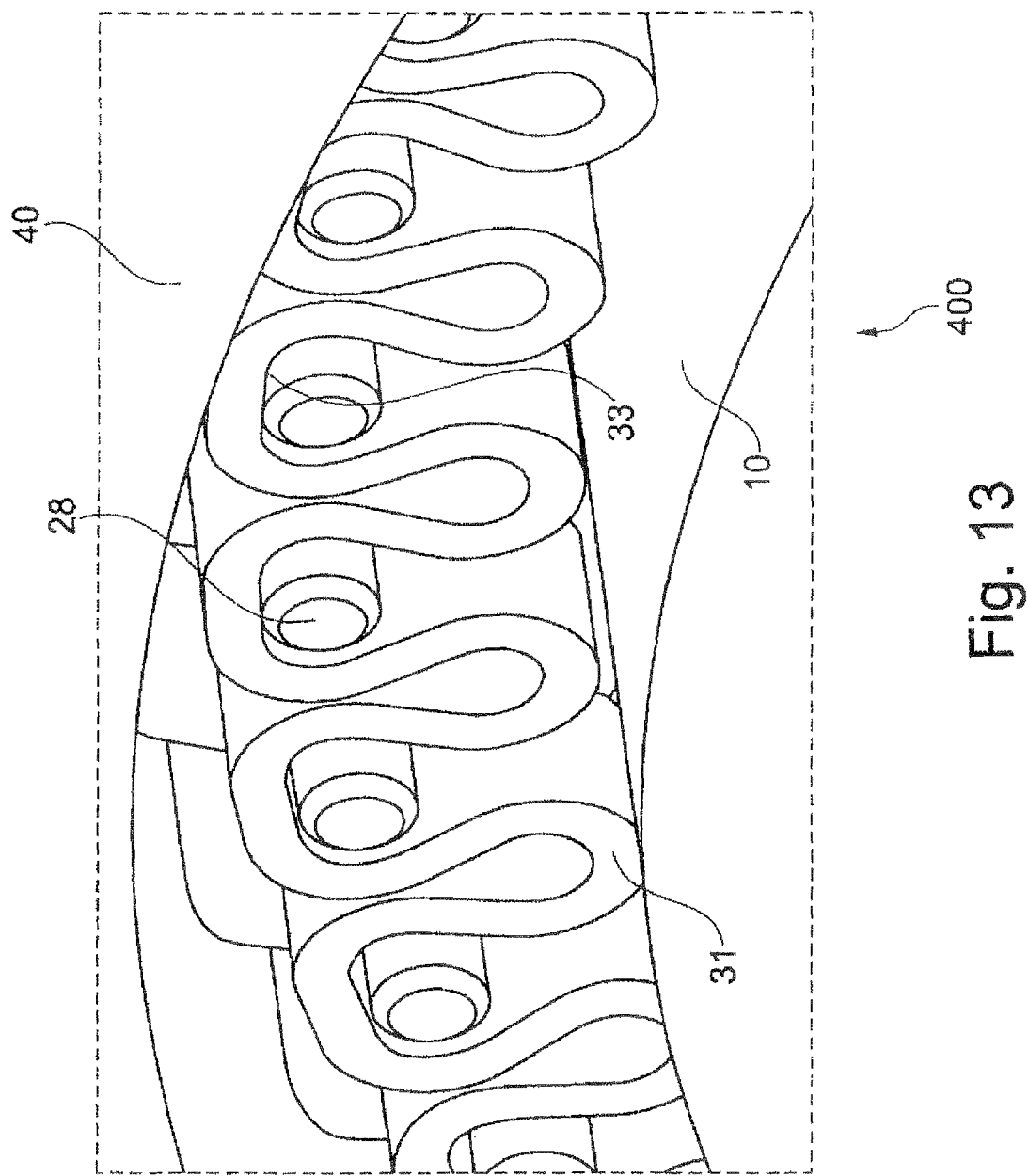
FIG. 13 shows a perspective view of a detail of the freewheel in FIG. 12.

FIGS. 12 and 13 show a further embodiment of the freewheel 400 of the present invention, which substantially corresponds to the embodiment shown in FIGS. 6 to 9. Also in the present embodiment, the first spring 31 (and the second spring 32) is designed as a meandering spring. Here every second loop of the first spring 31 (and of the second spring 32) comprises a rolling area 33 elongated in the circumferential direction of the freewheel 400. The rolling area 33 allows the pin-like projections 28 to migrate or to move along the rolling area 33 during the rotation of the rolling elements 20. All other components of the freewheel 400 correspond to the components of the embodiment of the freewheel 200.

FIG. 14 schematically shows the freewheel 100, 200, 300, or 400 of any of the previous embodiments mounted on a driven shaft 502 on an output side of a crank-CVT transmission 500.

LIST OF REFERENCE NUMERALS 100, 200, 300, 400 Freewheel
10 Inner Ring
40 Outer Ring
20 Rolling Element
24 First Rolling Element End
26 Second Rolling Element End
28 Projection
29 Bearing
22 Groove
30 Rolling Element Spring System
31 First Spring
32 Second Spring
33 Rolling Area

The invention claimed is:

1. A freewheel, comprising:
   an inner ring;
   an outer ring, which is rotatable in at least one direction of rotation relative to the inner ring and which is arranged radially around the inner ring;
   a plurality of rolling elements arranged between the inner ring and the outer ring; and
   at least one rolling element spring means arranged between the outer ring and the inner ring forcing the rolling elements in a direction of the inner ring, the spring means having a first spring of circular overall shape and a substantially rectangular profile in a longitudinal plane, wherein each of the plurality of rolling elements has a circular cylindrical pin-like projection extending from a longitudinal end of the each of the plurality of rolling elements,
   wherein the rolling element spring means has the first spring and a second spring with a circular overall shape, the first spring is arranged at a first rolling element end in the longitudinal direction of the freewheel and the second spring is arranged at a second rolling element end in the longitudinal direction of the freewheel, the first spring and the second spring each have a plurality of loops, and the each pin-like projection is received in a respective one of the plurality of loops.

2. The freewheel as claimed in claim 1, wherein the spring is serpentine in a circumferential direction about the freewheel.

3. The freewheel as claimed in claim 1, wherein the first rolling element end and the second rolling element end each have the pin-like projection for locating the first spring and the second spring.

4. The freewheel as claimed in claim 3, further comprising a bearing encircling the projection.

5. The freewheel as claimed in claim 1, wherein the first spring and the second spring each have elongated loops with a rolling area that allows the projection to roll within the elongated loops.

6. A CVT transmission, comprising at least one freewheel having an inner ring; an outer ring, which is rotatable in at least one direction of rotation relative to the inner ring and which is arranged radially around the inner ring; a plurality of rolling elements arranged between the inner ring and the outer ring; and at least one rolling element spring means arranged between the outer ring and the inner ring forcing the rolling elements in a direction of the inner ring, the spring means having a first spring of circular overall shape and a substantially rectangular profile in a longitudinal plane, wherein each of the plurality of rolling elements has a circular cylindrical pin-like projection extending from a longitudinal end of the each of the plurality of rolling elements, wherein the rolling element spring means has the first spring and a second spring with a circular overall shape, the first spring is arranged at a first rolling element end in the longitudinal direction of the freewheel and the second spring is arranged at a second rolling element end in the longitudinal direction of the freewheel, the first spring and the second spring each have a plurality of loops, and the each pin-like projection is received in a respective one of the plurality of loops.

\* \* \* \* \*